United States Patent
Brinckmann et al.

(10) Patent No.: US 6,369,680 B1
(45) Date of Patent: Apr. 9, 2002

(54) TRANSFORMER

(75) Inventors: Rainer Brinckmann, Lorsch; Steffen Otto, Babenhausen, both of (DE)

(73) Assignee: Expert Maschinenbau GmbH (DE)

( * ) Notice: Subject to any disclaimer, the term of this patent is extended or adjusted under 35 U.S.C. 154(b) by 0 days.

(21) Appl. No.: 09/381,900
(22) PCT Filed: Mar. 6, 1998
(86) PCT No.: PCT/EP98/01328
  § 371 Date: Oct. 27, 1999
  § 102(e) Date: Oct. 27, 1999
(87) PCT Pub. No.: WO98/44519
  PCT Pub. Date: Oct. 8, 1998

(30) Foreign Application Priority Data

Apr. 2, 1997 (DE) .................................. 297 05 789 U

(51) Int. Cl.⁷ .......................... H01F 27/08; H01F 27/28
(52) U.S. Cl. .......................... 336/60; 336/180; 336/65; 336/55
(58) Field of Search ............................ 336/60, 55, 65, 336/180

(56) References Cited

U.S. PATENT DOCUMENTS

| | | | |
|---|---|---|---|
| 3,633,273 A | * 1/1972 | Wilburn et al. | 29/602.1 |
| 4,682,000 A | 7/1987 | Holt et al. | 219/116 |
| 4,956,626 A | * 9/1990 | Hoppe et al. | 336/60 |
| 5,160,820 A | 11/1992 | Tsujii et al. | 219/116 |

FOREIGN PATENT DOCUMENTS

| | | |
|---|---|---|
| DE | 2430035 | 1/1976 |
| DE | 2549327 | 5/1976 |
| DE | 7830236 | 10/1978 |
| DE | 2739631 | 3/1979 |
| DE | 3405786 | 4/1985 |
| DE | 3603364 | 8/1986 |
| DE | 4108037 | 5/1996 |
| EP | 0105942 | 10/1982 |
| EP | 0199456 | 3/1986 |
| FR | 2551912 | 2/1984 |

OTHER PUBLICATIONS

Wilhelm Horn; AEG Widerstands—Schweisstransformeratoren, Bausteine der Widerstandsschweisstechnik; Techn. Mitt. AEG–Telefunken, 71, 1981, H.6, pp. 218–221.

* cited by examiner

*Primary Examiner*—Anh Mai
(74) *Attorney, Agent, or Firm*—Norris, McLaughlin & Marcus P.A.

(57) ABSTRACT

The invention relates to a mid-frequency high power transformer which is specially used as a welding transformer in resistance welding, comprising a primary winding penetrated by the limb of a transformer core and a secondary winding which are configured as concentrically overlapping cylindrical windings. The windings of the primary windings are formed by a plurality of spirally wound layers of a relatively thin electrically conductive metal strip material, and the windings of the secondary winding are formed by an appropriate number of spirally wound layers of a thicker electrically conductive metal strip material chosen according to the desired reduction ratio between the primary and the secondary windings. The width of the winding layers of the metal strip materials measured perpendicularly in relation to the longitudinal direction is substantially identical to or only slightly smaller than the length of the limb of the transformer core penetrating the windings, and the connection lines on the secondary winding are connected to the front face edges of the windings of the strip material of the secondary coil.

10 Claims, 3 Drawing Sheets

TRANSFORMER

BACKGROUND OF THE INVENTION

The invention relates to a mid frequency high power transformer, particularly for use as a welding transformer for resistance welding, with at least one primary winding through which one limb of a transformer core passes and a secondary winding, which windings are constructed as concentric cylindrical windings situated above one another.

Connecting together workpieces of metal plate is currently generally effected by resistance welding, welding robots preferably being used in mass production which carry welding tools for spot welding, e.g. of body work panels etc., at the free end of a working arm which may be moved into practically any desired working position. The welding current is provided by welding transformers with a voltage which is matched to the welding tongs, which are generally of low impedance, i.e. the welding transformers supply very high currents at relatively low secondary voltages at their output. The welding transformers should be disposed in the vicinity of the welding tongs, i.e. should be moved with the working arm of the robot. A prerequisite for this is as low as possible a weight of the welding transformers in order to prevent the robot arms having to be constructed very massively and thus heavily as a result of the weight loading and in order to ensure that the forces necessary for the precise movement of the working arms can be maintained as small as possible.

When resistance welding, the available mains alternating voltage, with a frequency of 50 or 60 Hz. is conventionally transformed to the necessary low welding voltage by means of single phase transformers. If high welding currents are necessary or light welding current sources are required, mains frequency transformers are unsuitable since relatively large transformer cores are necessary as a result of the low frequency. So-called mid frequency welding systems have thus been developed with operating frequencies of 300 Hz. to about 5 kHz. The higher frequencies permit a considerable reduction in size of the transformer cores in this case and, associated therewith, a considerable reduction in weight. Mid frequency transformers have previously been operated nearly exclusively with a rectifier connected to their outlet side in order to compensate for the inductive losses in the welding tongs which increase with frequency. Since such transformers are generally water cooled, a pancake coil construction is generally selected. The secondary windings are mostly constructed in the form of a hollow profile of rectangular cross-section, into the interior of which the cooling medium is conducted. On the other hand, the cooling of the primary winding is effected indirectly in that the pancake coils are wound in a plurality of layers from flat copper strip and are disposed in the spatial vicinity of the secondary coil. In so far as mid frequency welding transformers with cylindrical windings have been proposed in individual cases (DE 2549327 A1), attempts have been made to conduct away the heat losses which occur by causing a cooling medium to flow against the primary and secondary windings, conducted in cooling passages defined between them. As regards the magnetic coupling between the primary and secondary circuits and the achievement of as homogeneous current densities as possible in the windings, an optimal result is not achieved in this construction, as also when using pancake windings, the higher operating frequencies leading in particular to high losses in the transformer and thus to a reduction in efficiency.

SUMMARY OF THE INVENTION

Against this background, it is the object of the invention to provide a high power transformer with a low secondary voltage which may be used for resistance welding or resistance heating and may also be used as a welding transformer for welding robots operating with welding tongs by reason of its low weight, whereby the components necessary for rectification of the secondary current, which is desirable or necessary when resistance welding, are to be capable of being integrated into the transformer unit in a simple manner.

Starting from a transformer of the type referred to above, this object is solved in accordance with the invention if the turns of the primary coil(s) are constituted by a plurality of layers of an electrically conductive metallic strip material of relatively small thickness spirally wound on top of one another and the turns of the secondary winding are constituted by a smaller number, selected in accordance with the desired step down ratio of the primary to secondary voltage, of layers of an electrically conductive, metallic strip material of greater thickness wound on top of one another, the breadth of the winding layers of the strip materials, measured at right angles to the longitudinal direction, is substantially equal to or only slightly smaller than the length of the limb of the transformer core passing through the winding, and if the connecting lines on the secondary side are connected to the end face edges of the turns of the strip material of the secondary coil. The primary winding is thus—like the secondary winding—constituted by spiral layers of strip material wound on top of one another, e.g. strip-shaped bands of copper plate, the primary winding being constituted by a plurality of layers of thin strip material and the secondary winding being constituted by a smaller number of layers of thicker strip material with a relatively large cross-sectional area selected in accordance with the desired step-down ratio of primary to secondary voltage in order to conduct the high secondary currents away at low voltage with as low a resistance as possible.

In a preferred embodiment of the invention, the transformer is constructed as a single phase transformer of shell-type including a transformer core with three parallel limbs, which are spaced from one another and are connected at both ends by a respective web, whereby conveniently provided on the central limb of the transformer core there is firstly a first inner primary winding, radially adjoining a second winding, which concentrically surrounds the radially inner primary winding, and then a concentric, outer, secondary primary winding, which radially adjoins the secondary winding.

The connections of the transformer on the secondary side can advantageously be constructed in the form of strips of electrically conductive, metallic strip material, which are integrally attached to the edges of the winding layers of the secondary winding and which are bent outwardly approximately at right angles in a radius from the respective associated edge and at right angles to the central plane defined by the three limbs of the shell core over the respective associated end surface of the transformer winding. The shape of these connecting elements is thus disposed substantially in the direction of the field lines extending outside the core.

The connections of the transformer on the secondary side can have two respective strips of conductive, metallic strip material, which are attached to opposing edges of the winding layers of the secondary winding and are bent outwardly over the respective associated end surface of the transformer windings approximately at right angles from the respective associated edge and at right angles in a radius to the central plane defined by the three limbs of the transformer core, whereby the free ends remote from the windings of each pair of connecting strips connected to the same winding layer are then conveniently connected together by a respective common connecting plate of electrically conducted material, which extends over the winding substantially parallel to the central limb of the transformer core.

In a preferred embodiment of the invention the secondary windings have a total of three connectors or connecting plates which are connected to the radially innermost, the radially outermost and a central winding layer (centre tapping) of the secondary winding.

The connecting plates connecting the connecting strips connected to the radially innermost winding layer of the secondary winding and those connected to the radially outer most winding layer of the secondary winding are then conveniently arranged in a plane laterally offset from one another whilst the connecting plate connecting the connecting strips connected to the central winding layer is arranged in a parallel plane offset with respect thereto.

It is thus possible to integrate into the transfomer the rectifier circuit necessary for the rectification of the secondary current if connected to the flat surfaces remote from the coil of the connecting plate associated with the radially inner most layer of the secondary winding and with the radially outer most winding layer of a secondary winding there is a connector contact of at least one respective semi-conductor rectifier element, whose other electrical connections extend together to a common electrical connector of the secondary winding.

If the rectifier elements are constructed in the form of disk shaped high power semi conductor diodes with a respective connector contact surface provided on the opposed flat surfaces, then the construction can be such that the semi conductor diodes are in electrical contact with a connector contact surface on the surface remote from the windings of one of the parallel connecting plates of the secondary winding whilst their respective other connector contact surfaces are in electrical contact with the flat surface, directed towards them, of the parallel, offset contact plate, constituting the common connector.

In order to construct the contacts with as low a resistance as possible, the semi conductor diodes are conveniently clamped between the electrical connecting plates and the common connector contact plate, pre-stressed spring elements conveniently being used for this purpose.

In order to conduct away the heat losses, it is recommended that the transformer be enclosed in a housing, the interior of which is constructed substantially complementary to the outer shape of the transformer and whose walls are provided with passages for the flow of a liquid or gaseous cooling medium.

BRIEF DESCRIPTION OF THE DRAWINGS

The invention will be explained in more detail in the following description of an exemplary embodiment in conjunction with the drawings, in which.

DESCRIPTION OF THE PREFERRED EMBODIMENTS

Figure 1:
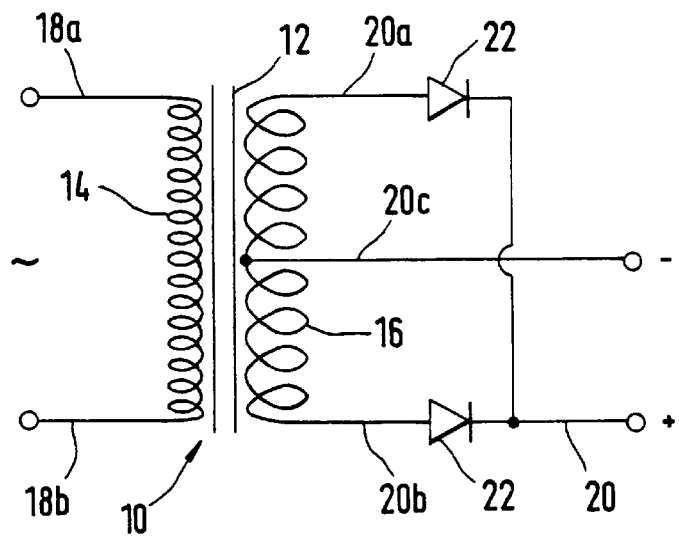
FIG. 1 shows the schematic circuit diagram of a single phase transformer with a rectifier circuit integrated into the secondary side.

FIG. 1 schematically shows the circuit diagram of a single phase transformer 10, which is provided as a welding transformer for transforming alternating current of high voltage at frequencies between about 300 Hz. to 5 kHz. into direct current of low voltage and high amperage. For this purpose, the transformer 10 has a primary coil 14 with a high number of windings provided on a transformer core 12 and a secondary coil 16 with a low number of windings. The primary coil 14 is connectable by means of connecting lines 18a, 18b to an electrical voltage source providing alternating current at high voltage and within the stated frequency range. The secondary coil 16 has a so-called central tapping, i.e. in addition to the connecting lines 20a, 20b connected to the outer ends of the coil windings, a third connecting line 20c is connected to the middle winding of the secondary coil. Connected into the secondary connecting line 20a and 20b are rectifier elements 22 which allow half waves of the alternating current induced in the secondary coil 16 to pass. The connecting lines 20a and 20b are electrically connected behind the diodes 22 to a common connecting line 20. The alternating current fed to the primary coil 14 is thus transformed into direct current of high amperage and reduced voltage, corresponding to the ratio of the number of winding layers of the primary and secondary coils, which may be tapped off from the connecting line 20 and the connecting line 20c.

Figure 2:
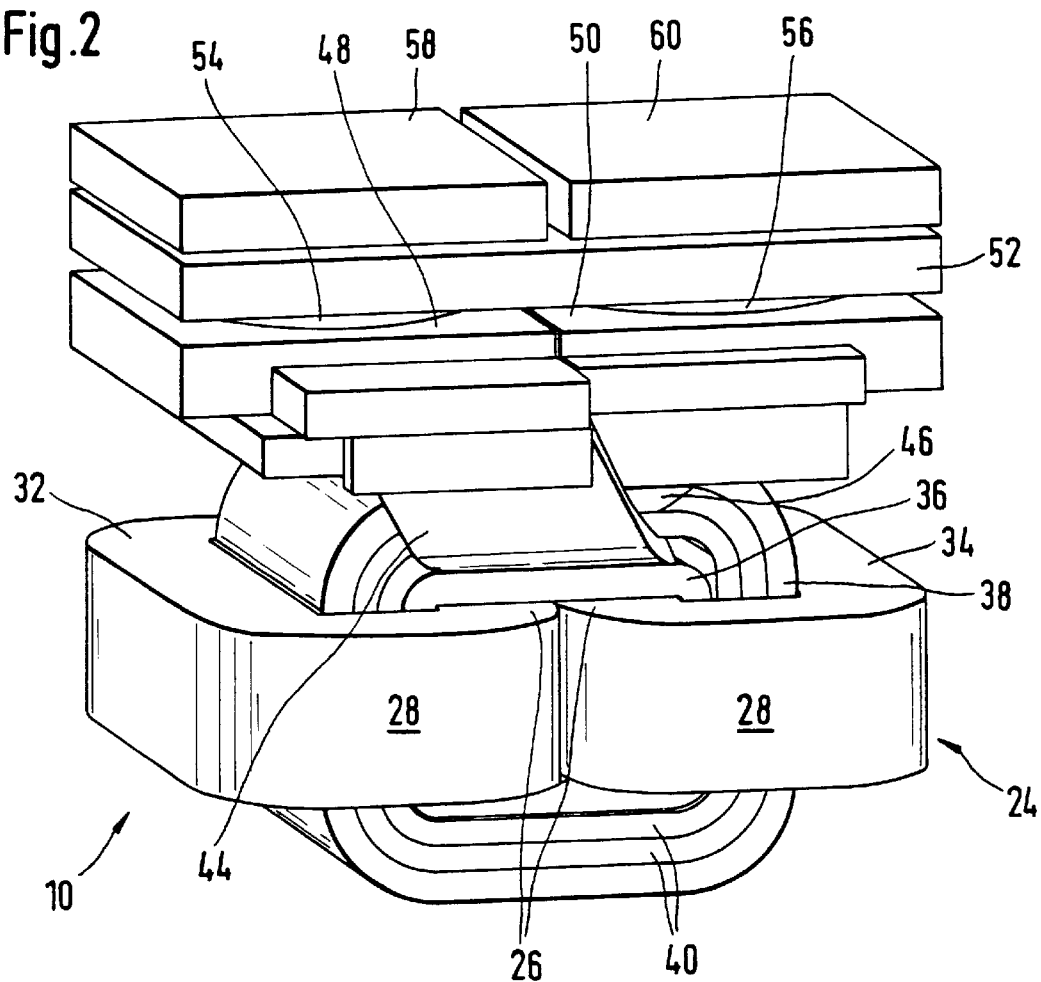
FIG. 2 is a perspective view of an exemplary embodiment of a welding transformer in accordance with the invention in the form of a single phase shell-type transformer.
Figure 3:
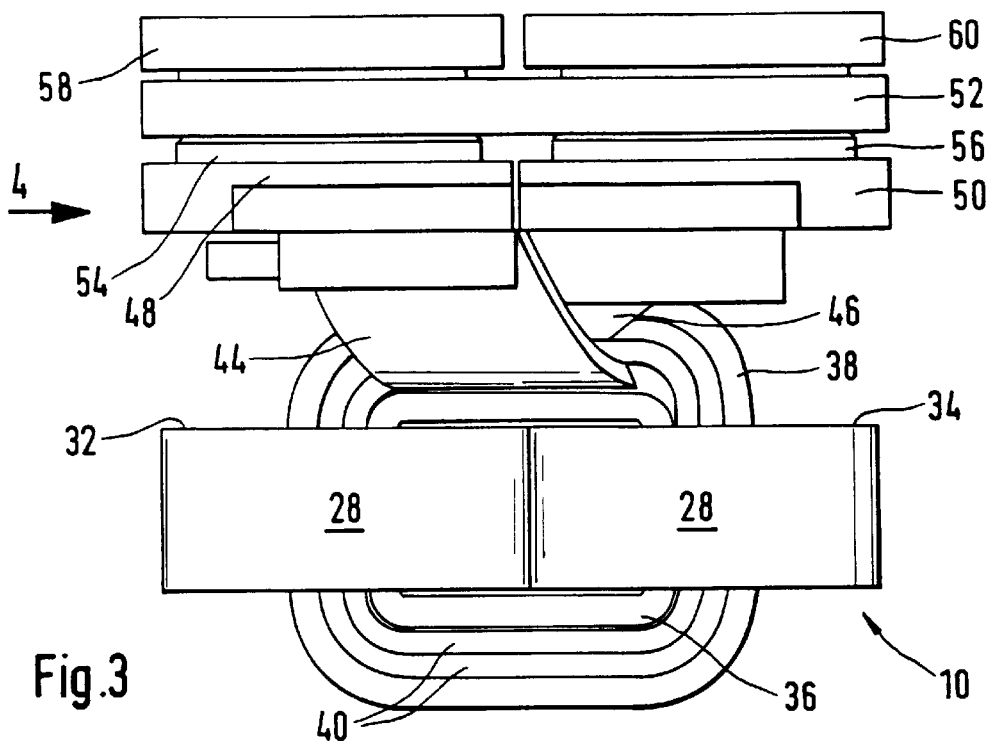
FIG. 3 is a front view of the transformer shown in FIG. 2.
Figure 4:
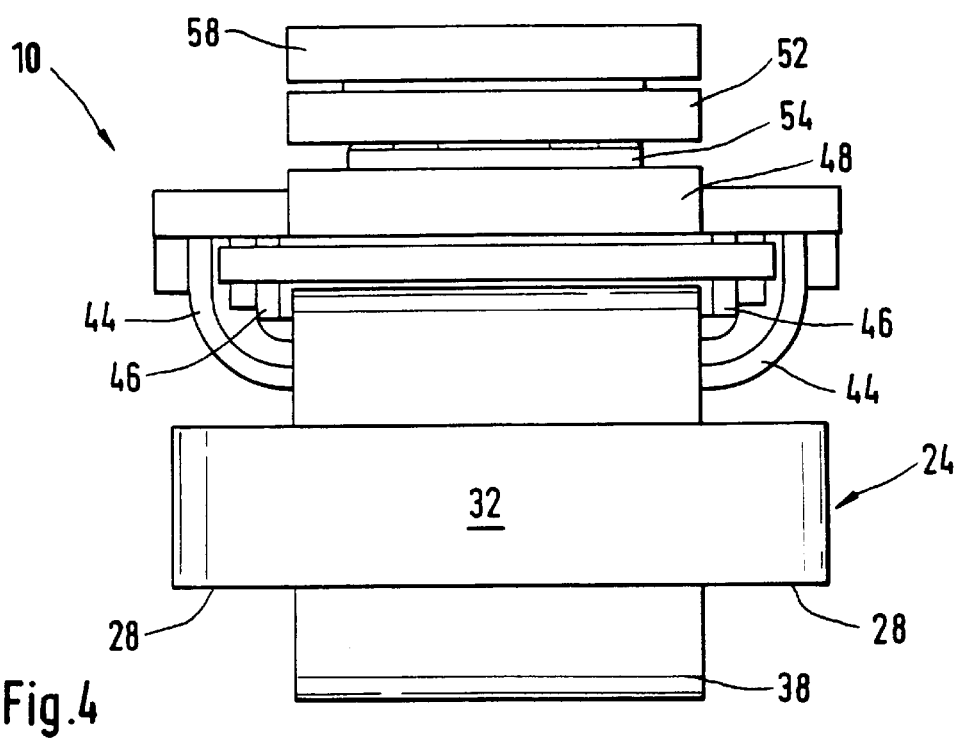
FIG. 4 is a view of the transformer seen in the direction of the arrow 4 in FIG. 3.

The internal construction of an exemplary embodiment of such a welding transformer 10, constructed in the form of a single phase shell-type transformer with an integrated rectifying function for the secondary current, is shown without its housing in FIGS. 2–4. Applied to the central limb of a transformer core, which is constituted by three parallel spaced core limbs, which are integrally connected at the opposite end faces by yokes or webs, are the primary and secondary windings 14 and 16, respectively, in the form of cylindrical or tubular windings which are each constituted by winding layers of strip-shaped copper bands spirally wound above one another, the breadth of which is substantially equal to or only slightly smaller than the length of the limb of the transformer core which passes through the windings. The transformer core, which is designated 24 as a whole in FIGS. 2–4, can be constructed in the conventional manner of metal strips insulated from one another, the central limb which carries the windings being designated 26 in the Figures and the two outer limbs, which are connected to the central limb 26 by means of yokes 28, being designated 32 and 34. The primary winding, which is designated 14 in the schematic circuit diagram of FIG. 1, is divided into two component windings, namely a first inner primary winding 36 and a second outer primary winding 38. The individual winding layers of strip material are not shown in the drawings. Arranged between the radially inner and radially outer primary windings 36 and 38 is the secondary winding 40 which includes only a few winding layers of thicker strip material.

The electrical connections to the two end turns of the secondary winding 40 are constituted by electrical connectors attached to the end surface edges of the respective outer turn of the strip material of the secondary coil in such a manner that attached to each of the two end surfaces of the winding layer to be connected there is a respective strip, i.e. a total of two strip pairs 44 and 46, of electrically conductive strip material, which are bent in an arcuate transition region outwardly over the associated end surfaces of the transformer windings 36, 38 and 40 into a layer extending approximately at right angles to the associated edge and at right angles to the central plane defined by the three limbs 32, 26 and 34 of the transformer core 24. The free ends remote from the windings of each pair 44, 46 of connecting strips which connected to the same winding layer, are then connected together by a respective common connecting plate 48 and 50, respectively, extending substantially parallel to the central limb 26 of the transformer core 24 over the windings 36, 38 and 40. These connecting plates 48 and 50 lie in the same plane, laterally offset from one another. The secondary winding 40 also has a central connector constructed in the same manner, provided in which from opposing edges of the central winding of the secondary coil 40 there is a respective connecting strip (not shown) bent over in the same manner, connected to whose outer ends remote from the winding there is a connecting plate 52, which is provided parallel to and at a small spacing above the connecting plate 48 and 50, respectively, and which extends parallel to and spaced above the connecting plates 48 and 50. Disposed in the spaces between the upper surfaces of the connecting plates 48 and 50 and the underside of the connecting plate 52 directed towards them is at least one respective disk shaped semiconductor diode 54, 56, whose opposed flat surfaces, which are constructed as connectors, are clamped between the connecting plates 48, 52 and 50, 52, respectively. The disk shaped semiconductor diodes 54, 56 act as rectifier elements of sufficiently high power which are thus in electrically conductive engagement with one contact surface against the common connecting plate 52 and with the other contact surface against the respective associated connecting plate 48 or 50. Resiliently clamping the semiconductor diodes 54, 46 between the connecting plate 52 and the respective associated connecting plates 48 and 50 ensures that even if the transformer components expand—for instance as a result of heating—the electrical contact between the connector plates and the contact surfaces of the diodes is not impaired. The biasing force which is to be applied can be produced, for instance, by (non-conductive) elastic spring elements 58, 60 which are disposed between the upper surface of the connecting plate 52 remote from the diode and the housing of the transformer, which is not shown in the drawings.

Figure 5:
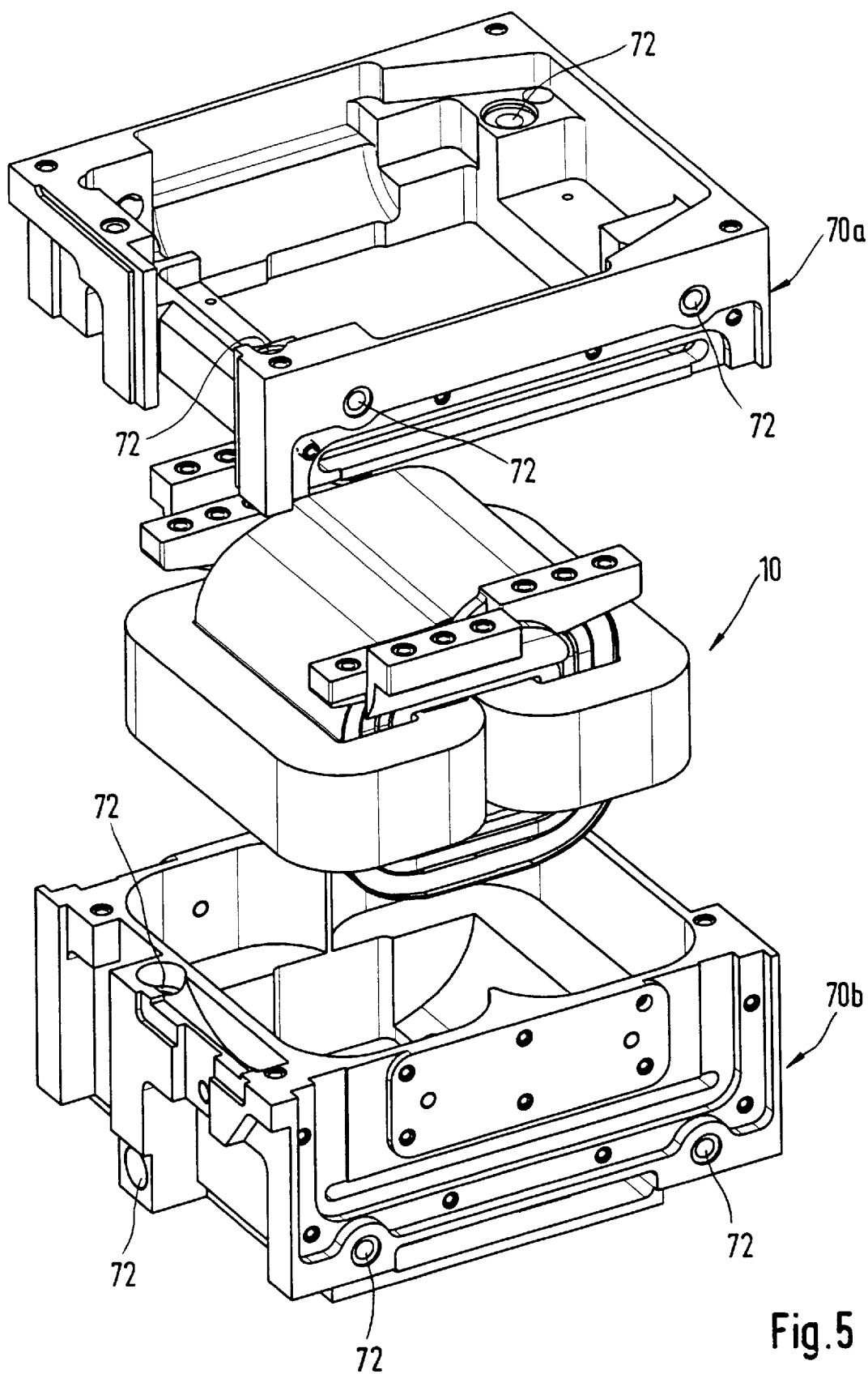
FIG. 5 is a perspective view of the transformer including the housing thereof in an exploded representation.

The housing 70a, 70b enclosing the actual transformer 10 shown in FIG. 5 is so constructed that its interior is constructed to be subtantially complementary to the external shape of the described components of the transformer, whereby the housing walls are then provided with passages 72 through which a gaseous or liquid cooling medium may flow.

It will be clear that modifications or developments of the described exemplary embodiment may be realised within the scope of the inventive concept, whereby it is of importance that the primary and secondary windings are constructed in the form of cylindrical or tubular windings of metallic strip material and at least the secondary side connecting lines to the end face edges of the windings of the strip material of the secondary coil are connected and so directed that their shape substantially follows the direction of the field lines extending outside the transformer core. As a result of the construction of the coil windings of thin copper strip layers in the primary winding and a few layers of relatively thick strip or plate material in the secondary winding, the current is conducted approximately in planes which are defined by points of the same magnetic field strength outside the transformer core. The effect of an increase in resistance observed with high frequency alternating currents as a result of inhomogeneous current distribution is thus reduced so that the welding transformer constructed in this manner makes a power increase possible whilst reducing the weight and with reduced dimensions.

What is claimed is:

1. A mid-frequency high power transformer, comprising:
   a transformer core having a plurality of limbs integrally connected by means of yokes (28);
   at least one primary winding through which one limb of said transformer core passes;
   a secondary winding;
   two strip pairs (44,46) connected to said secondary winding; and
   an outer housing whose interior is constructed substantially complementary to the outer shape of the transformer and whose walls are provided with passages for the flow of a cooling medium;
     wherein said primary and secondary windings are constructed as cylindrical windings concentrically situated above one another and characterized in that the turns of the primary winding are constituted by a plurality of layers of an electrically conductive metallic strip material having a thickness and a breadth spirally wound on top of one another, and
     wherein the turns of the secondary winding are constituted by a plurality of layers of an electrically conductive metallic strip material having a breadth and a greater thickness than the thickness of said primary winding metallic strip material, and spirally wound on top of one another wherein the number of turns of the secondary winding are a smaller number than the number of turns of the primary winding, and the number of turns of the secondary winding is selected in accordance with the desired step down ratio of the primary to secondary voltage; and
     wherein the breadth of the metallic strip material of the primary and secondary windings, measured at right angles to the longitudinal direction, is equal to or less than the length of the limb of the transformer core passing through the primary winding.

2. The transformer of claim 1, wherein the transformer is of a single phase, shell-type, wherein
   the transformer core has three parallel-spaced limbs designated as a central limb, a first outer limb and a second outer limb, said first and said second outer limbs integrally connected to said central limb by means of the yokes (28);
   said central limb passes through said primary winding, said primary winding being divided into a first inner primary winding (36), and a second outer primary winding (38);
     wherein provided on the central limb (26) of the transformer core (24) there is firstly said first inner primary winding (36), radially adjoining said secondary winding (40), which concentrically surrounds said first inner primary winding (36), and then a concentric, outer, second primary winding (38) which radially adjoins said secondary winding (40).

3. The transformer of claim 2 wherein said two strip pairs connected to said secondary winding are constructed of electrically conductive metallic strip material bent outwardly at approximately right angles in a radius from said secondary winding and at approximately right angles to a central plane defined by said three limbs of said transformer core.

4. The transformer of claim 3 wherein said two strip pairs are constructed of electrically conductive metallic strip material, each pair being attached at one end to the opposing edges of said secondary winding and bent outwardly at approximately right angles in a radius from said secondary winding and at approximately right angles to a central plane defined by said three limbs of said transformer core, whereby the ends of each of said strip pairs that are unattached to said secondary winding are connected together by connecting plates (48, 50) of electrically conductive material extending over said primary and said secondary winding and substantially parallel to the central limb of said transformer core.

5. The transformer of claim 4 wherein said connecting plates (48, 50) are connected to said radially innermost and said radially outermost layer of the secondary winding (40) and a secondary winding connecting plate (52) is connected to said central winding layer of the secondary winding (40).

6. The transformer of claim 5 wherein said connecting plates (48, 50) are arranged substantially in a plane offset from one another and said secondary winding connecting plate (52) is arranged in a plane parallel to and at a spacing above said connecting plates (48, 50).

7. The transformer of claim 6 further comprising at least one semiconductor rectifier element having opposed flat surfaces construed as connectors wherein one of said connectors is connected to said connecting plates (48, 50) and said other connector is connected to said secondary winding connecting plate (52).

8. The transformer of claim 7 wherein said semiconductor rectifier elements are disposed between an upper surface of said connecting plates (48, 50) and the underside of said secondary winding plate (52), said rectifier elements constructed in the form of disk-shaped semiconductor diodes (54, 56) having opposed flat surfaces construed as connectors wherein one of said connectors is in electrical contact with said upper surface of said connecting plates (48, 50) and said remaining connector is in electrical contact with said underside of said secondary winding connecting plate (52).

9. The transformer of claim 8, wherein said semiconductor diodes (54, 56) are clamped between the parallel connecting plates (48, 50) and the secondary winding plate (52).

10. The transformer of claim 9, wherein said parallel connecting plates (48, 50) and said secondary winding connecting plate (52) are urged by pre-stressed spring elements (58, 60) against the respective opposed flat surfaces of said semiconductor diodes (54, 56).

* * * * *